United States Patent [19]

Seidel

[11] 3,973,530

[45] Aug. 10, 1976

[54] INTERNAL COMBUSTION ENGINE

[76] Inventor: Hans H. Seidel, Wagnerstr. 9, 8700 Wurzburg, Germany

[22] Filed: Dec. 23, 1974

[21] Appl. No.: 535,350

[52] U.S. Cl. .......................... 123/32 SP; 123/32 B; 123/75 B; 123/32 L
[51] Int. Cl.[2] .................. F02B 19/10; F02B 19/16
[58] Field of Search ......... 123/32 ST, 32 SP, 191 S, 123/191 SP, 32 B, 32 C, 32 D, 32 L, 75 B, DIG. 4

[56] References Cited
UNITED STATES PATENTS

| | | | |
|---|---|---|---|
| 820,285 | 5/1906 | Cross | 123/32 |
| 1,874,569 | 8/1932 | Meyer | 123/32 B |
| 3,166,051 | 1/1965 | Hallberg | 123/32 SP |
| 3,283,751 | 11/1966 | Goossak et al. | 123/32 ST |
| 3,777,724 | 12/1973 | Kiley | 123/32 |

Primary Examiner—Charles J. Myhre
Assistant Examiner—Ronald B. Cox
Attorney, Agent, or Firm—Robert K. Youtie

[57] ABSTRACT

The invention is related to an internal combustion engine, the combustion chamber of which is divided into two partial chambers or two groups of partial chambers by at least one perforated separation wall to one of these chambers or groups of chambers, hereafter called an ignition chamber, which includes an ignition device, a rich mixture is admitted via an intake valve and to the other of which, hereafter called a second combustion chamber, a lean mixture or air is admitted via another intake valve.

7 Claims, 15 Drawing Figures

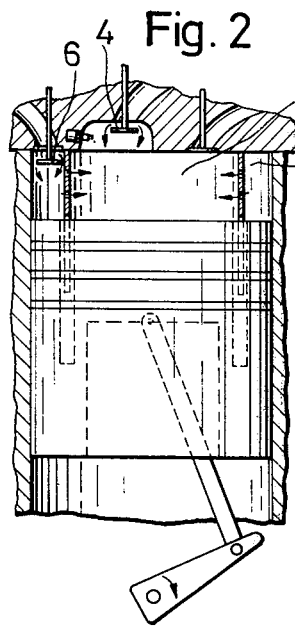
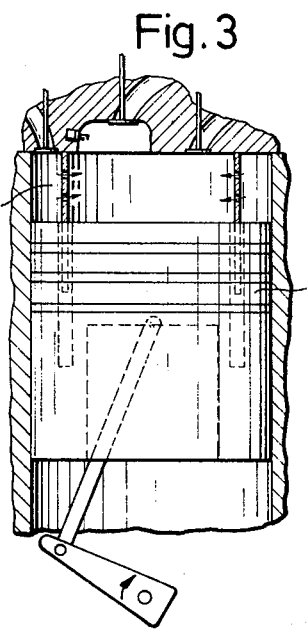
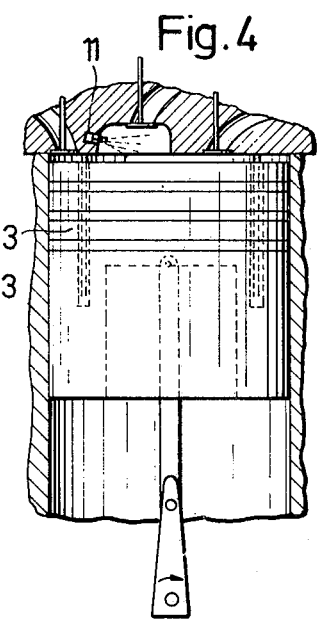
Fig. 2　　Fig. 3　　Fig. 4
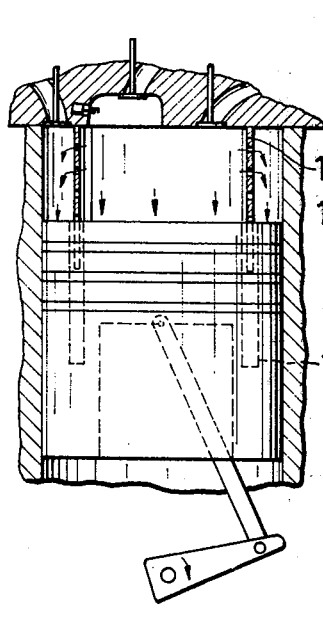
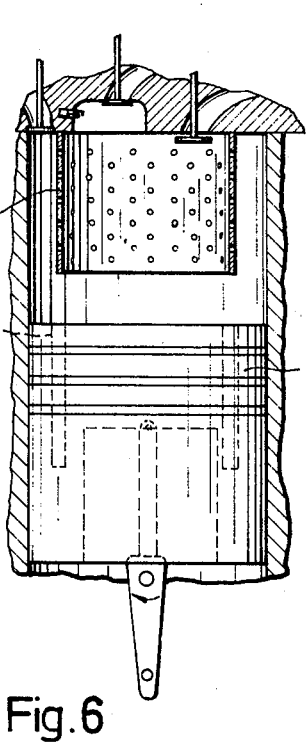
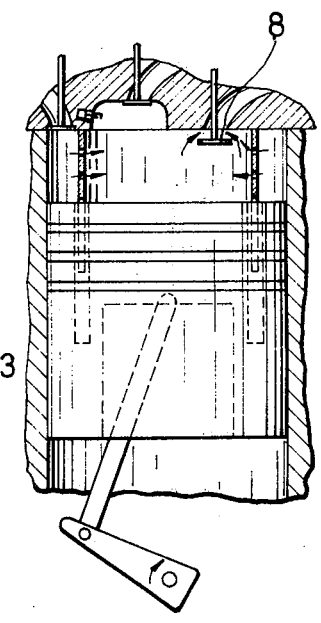
Fig. 5　　Fig. 6　　Fig. 7

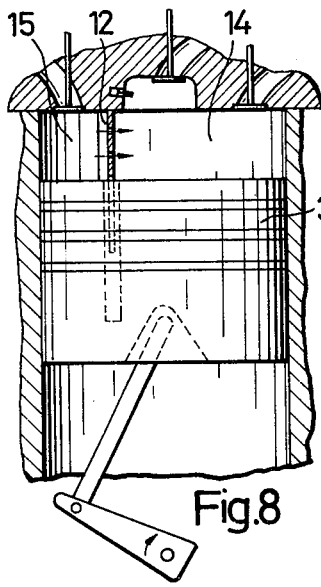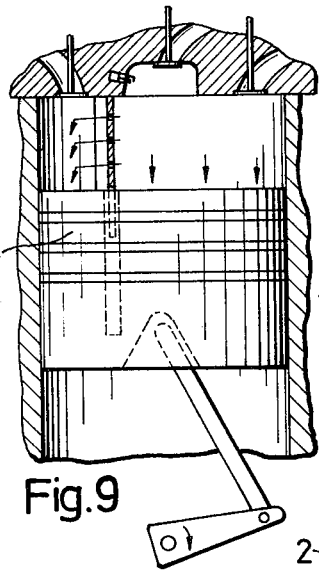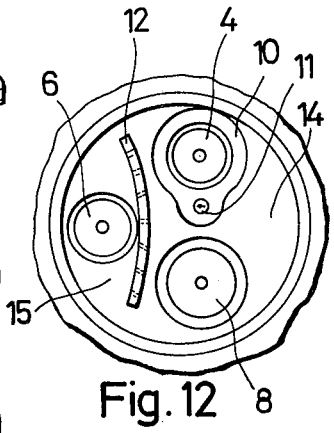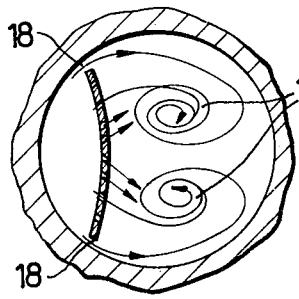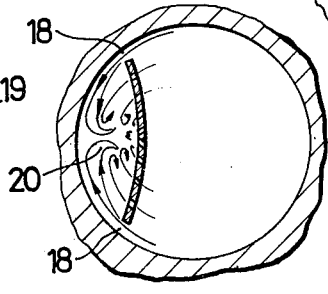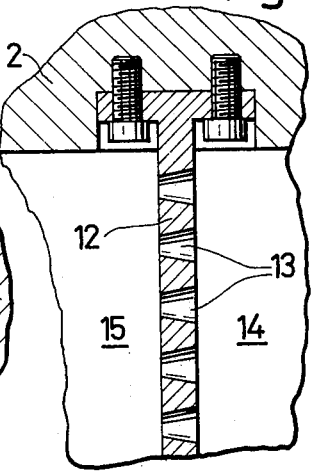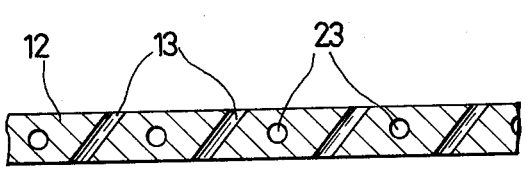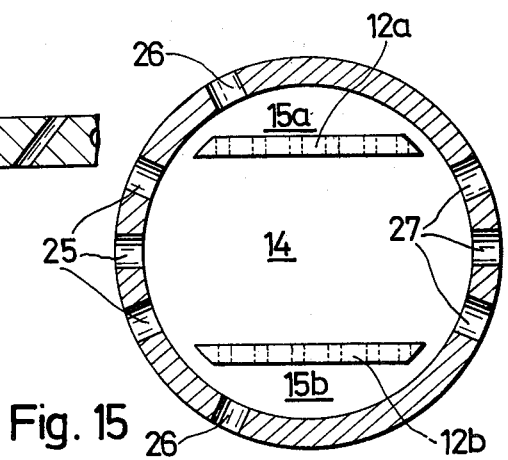

INTERNAL COMBUSTION ENGINE

BACKGROUND OF THE INVENTION

In the activity of research and development in the automobile area almost half of the expenses are related today to exhaust pollution control (Automobil Revue, Bern 12,11,1970, page 39). The origin of difficulties in this area is based on the fact that fuel excess is necessary for a safe ignition of the fuel-air mixture during starting, cold engine, partial load, and idling which leads to the fact that incomplete combustion takes place in the cylinders and the exhaust gases contain poisonous constituents, especially excessive amounts of carbon monoxide CO and unreacted hydrocarbons CH. Also ketones and aldehydes in the exhaust cause pollution effects.

For a homogeneous mixture the practical region of inflammability lies in the range of air-to-fuel weight ratios between 8 to 1 and 18 to 1. For the usual Otto-cycle engine with injection the air intake is throttled at partial loads with the intention of maintaining the aspirated mixture in the region of inflammability. The behavior at partial load presents of course an important point in regard to the normal utlization of a car. At mean speeds on the flat a car needs only a small fraction of the maximum engine power, for instance a heavy car only 20 to 30 horsepower such that increased pumping losses result because of air throttling during the major part of the operation time with constant unfavorable exhaust gas characteristics. The poor efficiency at partial loads of common engines can be slightly improved by increased compression, but on the other hand this increased compression requires special anti-knock fuels with additives such as lead and bromine compounds which contribute themselves to increased pollution.

In todays common engines, a fuel excess of 15% over the theoretical stoichiometric mixture is utilized with the result, that in gasoline engines up to 25% of the fuel energy is discharged unutilized via the tail pipe. In the case when the motor is operated with less fuel excess, not only do difficulties in ignition increase because of the lower flame propagation velocity with normal spark plug ignition, but also because of far higher combustion temperatures in the range of stoichiometric ratio the content of nitrogen oxides $NO_x$ increases and as a consequence the thermal constraints and losses, up to the point whereat leaner mixtures intermittent operation begins.

In order to get rid of the unburned constituents of the exhaust gas an afterburn is used which is achieved by reheating, admission of air or air-fuel mixture, or passing the gases through a catalytic reactor. In this context several exhaust gas recirculating systems are known. With these methods the unburned fuel stemming from the combustion chambers is burned not only without any gain in performance, but even with increasing losses caused by additional injection, heating, and compressor systems, and by the fact that there is increased back pressure in the exhaust manifold, which decrease the total efficiency. Also some enthusiasts tend to eliminate the corresponding sources of losses by small manipulations, but thereby losing the desired pollution control intentions. The catalytic reactors will be anyway ineffective after short operation time.

Many concepts have already been proposed U.S. Pat. Nos. 1,649,700 and 2,849,992; New Scientist 10,5,1973, page 347; auto motor und sport 3/1973, page 35) to obtain a more complete combustion by stratification in the cylinder with the aid of a combustion chamber consisting of two parts. As a result the combustion chamber consists of an ignition chamber in the form of an ignition prechamber and a second combustion chamber which represents the main chamber. When the ignition prechamber is filled with a rich mixture or by relatively high injection rates, the main chamber receives via a special valve either a lean mixture or pure air. The spark plug is located in the ignition prechamber, but expansion takes place in the main chamber. The two parts of the combustion chamber are connected to one another. During ignition the rich mixture in the ignition prechamber can be easily ignited, after which, by the effect of explosion and by ejection of burning fuel particles along flow paths which generate a good turbulence, it enters into the lean mixture or the air of the main chamber and burns completely during the expansion. Such a motor with stratification can operate even at air-fuel weight ratios of up to 40 or 50 to 1. It is also known U.S. Pat. No. 2,884,913, DT-OS No. 1,526,300), according to the described type, to separate the ignition chamber which is constructed as a prechamber in the cylinder head in pear-shaped form, from the second combustion chamber serving as main chamber which represents also the expansion chamber of the cylinder, by a perforated separation wall, holes in this create the necessary turbulence due to the prescribed channel direction. With these known concepts high throttling losses will result between the ignition chamber and the main chamber during the compression and expansion stroke. Also the filling efficiency is unfavorable due to the use of a prechamber.

SUMMARY OF THE INVENTION

However, the objective of this invention is to respond to the requirements of complete pollution control, of a safe ignition, and an unreduced efficiency. This objective is solved according to the invention by the fact that beginning with a motor of the described type, each of the partial chambers is limited at one side by the piston and that the perforated separation wall or walls enter into the grooves of the relatively displaceable piston. The result of this concept is that initially, during the intake stroke, the second combustion chamber is filled with air or lean mixture which serves hereby as a reservoir or supply chamber, and the ignition-combustion chamber is charged via a special intake valve with a rich mixture. It is favorable if, by differential throttling of the two intake ports, admission of air or lean mixture into the ignition-combustion chamber takes place during the intake stroke through the holes of the separation wall. During the following compression stroke a stratification within the ignition-combustion chamber with favorable negative gradient of fuel concentration away from the spark plug will result due to the different adiabatic behavior of the mixtures. By the separation wall and channel direction within the separation wall, this flow and therefore the fuel-air distribution can be influenced such that the spark plug remains in the rich mixture region, but along the walls and piston surface there exists air or lean mixture. The turbulence produced by this flow favors the following combustion which leads to a good ignition in this chamber due to the high fuel concentration around the spark plug and the unthrottled propagation of the combustion. During the combustion process within the ignition-combustion chamber, hot combustion gases enter into the second combustion or supply chamber through the holes of the separation wall, and the still unburned constituents react due to an afterburning with the oxygen and therefore the second combustion chamber serves as afterburning chamber. The resulting pressure increase acts immediately on the corresponding part of the piston due to the entry of the gases into the second combustion chamber and due to the afterburning effect. This increased pressure, which persists during expansion for a longer period of time, leads to a better thermodynamic efficiency. After passage of the burning mixture through the perforated separation wall, the combustion in the second combustion chamber is caused by real afterburning which releases mechanical energy because it takes place within the cylinder during expansion. Due to the operation in the range of air excess, the temperature increases only moderately so that a development of $NO_x$ is not possible; on the other side, however, it is high enough that eventually still existing unburned fuel parts within the ignition-combustion chamber can react with the oxygen from the second combustion chamber during the exhaust cycle without the necessity of having a special means in the exhaust system for their oxidation. If pure air is admitted into the second combustion chamber, a good result is given in the case of having a normal mixture ratio in the ignition-combustion chamber and of seizing the second combustion chamber in the order of 30 to 40% of the total volume of the combustion chamber.

Although the principle of this invention is applicable to combustion chambers and piston movements of different forms and systems, for instance to rotational piston engines with proper sealing between the rotational piston and the lateral walls, the invention is particularly applicable to reciprocating engines. For its use with a four-stroke engine the arrangement of the combustion chambers is preferably such that the second combustion chamber has the form of a cylinder ring chamber with a placement of the axis-parallel cylindrical separation wall concentrically around the ignition-combustion chamber which is situated along the axis of the cylinder. This design offers the advantage that, as well on the heated separation wall during operation, as on the cold cylinder wall in the second combustion chamber, where a very lean mixture is present, no extinction of the flame is possible with the result, that there is no cause for unburned fuel to be there, nor is the oil film diluted by the fuel. The cylinder wall remains relatively cool; the piston rings run in a cool environment and are therefore tight; there is no oil burning nor combustible gases entering into the crankcase. The result is, besides the higher efficiency, a longer life of the engine.

An alternative consists in a separation wall which separates a second combustion chamber along parts of the cylinder wall, i.e., on one side of the cylinder only, which could be in the form of a segment of a cylinder. The separation wall can be plane or curved for higher rigidity. By those means a better arrangement is given for an easier installation of the intake valve into the second combustion chamber.

It is advantageous to place the ignition device, generally a spark plug, and preferably also the intake valve for the ignition-combustion chamber into a recessed chamber in the cylinder head which joins the ignition-combustion chamber. By this arrangement the stratification, especially the accumulation of a rich mixture around the spark plug, is assured because the mixture in the recessed chamber is not influenced during the intake and compression stroke by the flow of air through the holes of the separation wall. It is also possible to use the so-called squish turbulence which during the compression stroke presses the air between the piston and parts of the cylinder head into the region before the recessed chamber for an acceleration of flame propagation, if the separation wall has holes just before the cylinder head. The region of recessed chamber contains still an ignitible mixture. The construction of the recessed chamber is advantageous also during partial load or idling operation. The air aspirated into the second combustion chamber can be led to it during idling in a known throttled or unthrottled fashion, such that in the latter case the ignition-combustion chamber presents a considerable air excess during partial load U.S. Pat. No. 2,884,913). The actual rich mixture is just sufficient duing idling, in order to fill the recessed chamber and to assure a safe ignition. The unthrottled air admission results in also that the condensed fuel in the intake mainfold does not vaporize during the sudden change from full load to idling or braking operation and as a consequence no additional fuel vapor is admitted into the cylinder which would cause a sudden increase of discharged pollution gases.

Desired modifications of the invention consist in the fact that the cylinder ring-shaped second combustion chamber is equipped with several intake valves that it can easily filled with lean mixture or air and that the exhaust valve joins the ignition-combustion chamber, in order that the hot gases are not required to pass through the second combustion chamber and to leave it relatively cool, and that it serves essentially as air supply chamber for the afterburning taking place partially within the second combustion chamber and partially within the ignition-combustion chamber.

Another application of this invention is related to two-stroke internal combustion engines in a possible design such that the second combustion chamber, eventually consisting of several parts, is located with axis-parallel separation walls along parts of the cylinder wall and that the slots, serving as valves and actuated by the piston in the bottom dead center and which are combined with the manifolds of the exhaust and the two intake gas mixtures, lead into the ignition-combustion chamber and into the second combustion chamber. The second combustion chamber does not completely encompass the ignition-combustion chamber, but the latter reaches partially up to the cylinder wall, on which the manifolds join to enter the respective combustion chambers.

For high-powered engines the perforated separation wall can be cooled by means of channels through which a cooling fluid circulates.

By the arrangement and the form of the holes in the separation wall the gas exchange between the two combustion chambers can be influenced and optimized for the appropriate design. For instance, it could be advantageous if the holes in the separation wall present a conical form which decrease in diameter toward one of the combustion chambers. By these means, a good turbulence and a homogeneous mixture can be attained. Besides, a certain opposite reaction force can be achieved against the normal force toward the separation wall. Because of the special characteristics of the conical holes it can be advantageous for the fluid flow during the different strokes to pass through conical holes arranged alternately in different directions. Additionally, a vortex zone formation can be generated by a tangential component of the holes.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

Further details and specialities of the invention result from the description of design examples referring to the following drawings:

FIGS. 2 to 7 represent schematically the consecutive stokes and piston positions of a four-stroke engine according to the invention.

FIGS. 8 and 9 represent schematics according to FIGS. 3 and 5 with another design possibility of separation wall.

FIGS. 10 and 11 represent a cross-section of cylinder with vortex-zone generation during the strokes corresponding to FIGS. 8 and 9.

FIG. 12 shows a view of the underside of the cylinder head according to FIGS. 8 to 11.

FIG. 13 shows the design of a lateral section of a separation wall.

FIG. 14 represents a cross-section through another design of a separation wall.

FIG. 15 represents a cross-section through the cylinder of a two-stroke engine according to the invention.

DESCRIPTION OF THE PREFERRED EMBODIMENTS

Figure 1:
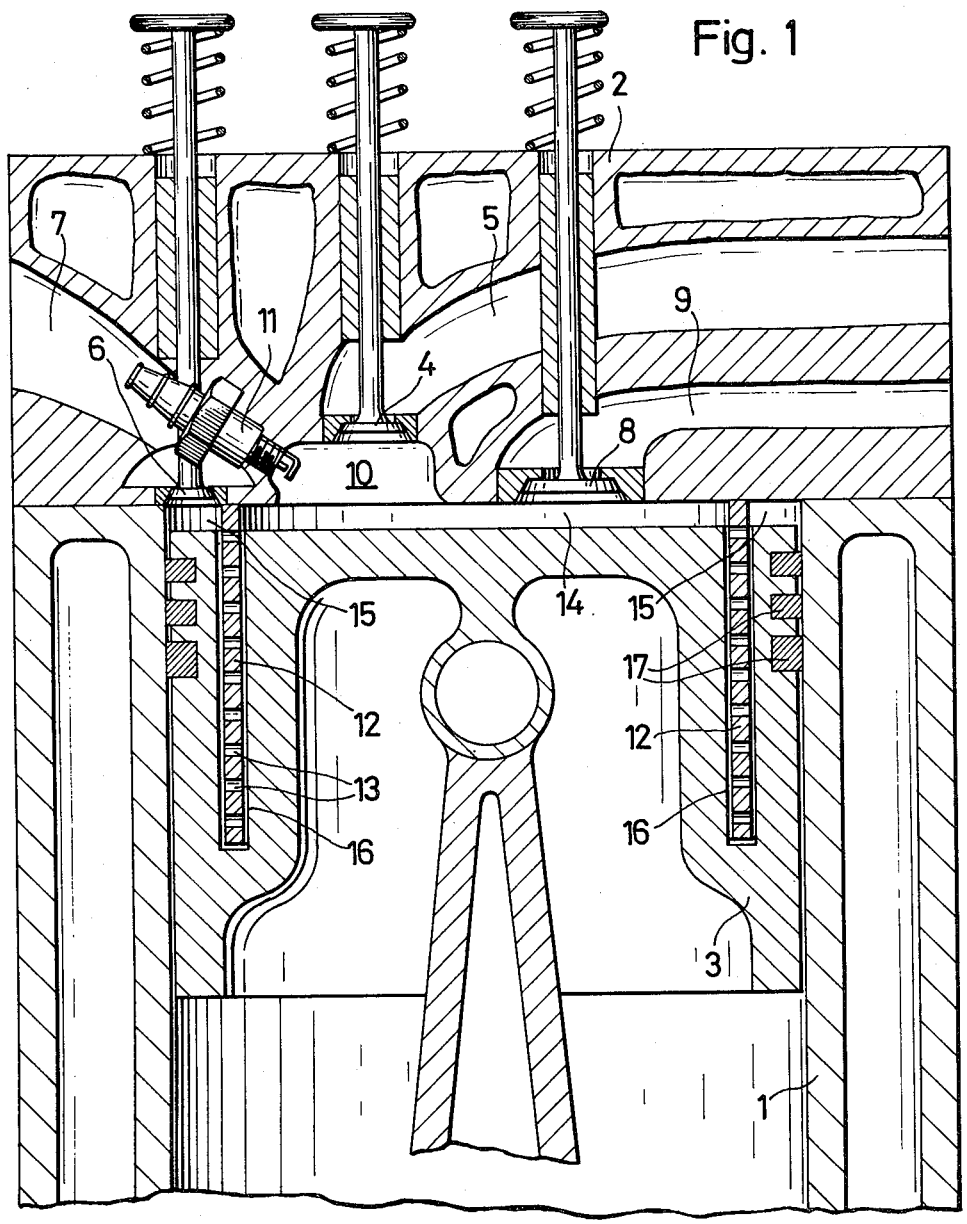
FIG. 1 represents a cross-section through the cylinder head, the piston, and the section of a cylinder of a four-stroke engine according to the invention.

A cylinder 1 of common design is equipped with the cylinder head 2 and a piston 3. Within the cylinder head there are an intake valve 4 for rich mixture coming from the manifold 5 and one or several intake valves 6 for air coming from the manifold 7 and an exhaust valve 8 which leads to the exhaust manifold 9.

The intake manifold leads via an intake valve 4 into the recessed chamber 10 of the cylinder chamber in which the spark plug is found (11).

In the cylinder 1 there is a cylindrical perforated separation wall 12 which is fastened to the cylinder head and the axial length of which is smaller than the stroke of the piston 3 and which is equipped with holes 13. The separaton wall 12 divides the cylinder chamber into an ignition-combustion chamber 14 along the axis and into a second combustion chamber 15 along the cylinder wall. The recessed chamber 10 and the exhaust valve 8 are placed in the ignition-combustion chamber 14 which is completely encompassed by the separation wall 12, whereas the intake valve 6 is found in the outside of this chamber, i.e., in the region of the second combustion chamber 15 between the separation wall 12 and the cylinder wall.

The piston 3 is equipped with a circular groove 16 into which the separation wall 12 enters. The separation wall 12 has a certain small clearance between the walls of the circular groove 16 such that the piston 3 and the separation wall 12 can move relative to each other without friction. On the outside of the piston 3 the piston rings 17 are placed in a conventional manner for tightness against the cylinder wall.

The working process of the cylinder of the engine according to the invention is illustrated in FIGS. 2 to 7. FIG. 2 represents the intake stroke. The intake valves 4 and 6 are open and the exhaust valve 8 is closed. Rich and easily ignitible mixture enters through the intake valve 4 and pure air through the intake valve 6 with a rate that complete combustion of the fuel present during full load operation can be achieved. In practice, unused fuel is exhausted even at the theoretically correct stoichiometric mixture ratio. The required quantity of air is therefore slightly greater than that in the exact stoichiometric mixture ratio. The required quantity of air is therefore slightly greater than that in the exact stoichiometric ratio. In order to avoid the extremely high temperatures at these mixture ratios and the resulting generation of $NO_x$ reaction products, it is advisable to operate with higher excess of air without having a too much performance loss. During partial load and in comparison with the rich mixture together with the air admission with small or no throttling, the air-fuel ratios change to correspondingly higher values.

During the following compression (FIG. 3) it results by different adiabatic behavior between the mixture and the pure air and also by the presence of the recessed chamber 10, that eventually air is penetrating through the holes 13 of the separation wall 12 from the second combustion chamber 15 which serves as supply chamber, to the ignition-combustion chamber 14 which leads to a dilution of the mixture. The air, however, does not enter the recessed chamber. Away from the spark plug 11 which is placed in the recessed chamber 10, there is a fuel concentration gradient toward a leaner mixture.

During the following ignition (FIG. 4) the undiluted rich and easily ignitible mixture can be found in the region of the spark plug 11 and its combustion propagates like a flame into the range of lean mixture in the ignition-combustion chamber 14 with resulting expansion (FIG. 5) by motion of the piston. During the expansion, also, the ignited mixture passes through the holes of the separation wall into the second combustion chamber 15 serving as an afterburn chamber, where it reacts completely with air whereby giving additional energy for the expansion because of the afterburn.

In the bottom dead center of the stroke (FIG. 6) the separation wall 12 has at the present design completely retracted from the circular groove of the piston. By these means, at this instant there is still a free gas exchange possible between the ignition-combustion chamber 14 and the second combustion chamber 15 after which a complete pressure equilibrium is achieved. With this design a circular groove which does not reach too deeply into the piston is required.

During the following exhaust stroke (FIG. 7) the remaining still unused portion of air from the second combustion chamber 15 mixes with any remaining fuel constituents in the combustion gas of the ignition-combustion chamber 12. The air from the second combustion chamber 15 reacts with the unburned portions during the exhaust stroke in the region of the exhaust valve and exhaust manifold and leads to the final afterburn. The resulting temperatures are moderate such that almost no $NO_x$ is formed, however, they are high enough to continue the afterburn reactions without injecting additional fuel or having a catalytic reactor.

The control of the two intake valves can be performed by a common slave drive. By these means small relative differences in opening and closing time can be foreseen, if this is necessary for efficient gas flow during intake stroke.

FIGS. 8 and 9 represent the design of a modified flat separation wall 12, which separates a second combustion chamber 15 in the form of a cylindrical segment. The flat separation wall 12 leaves a crevice 18 on both sides of the cylinder wall. The holes 13 within the separation wall 12 present tangential components such that during the compression stroke (FIGS. 8, 10) with the aid of the crevice between the separation wall and cylinder wall two independent local vortices 19 are formed within the ignition-combustion chamber 14 which result in a good mixing, high turbulence. During the expansion stroke (FIGS. 9, 11) the pressure compensation, by the gas passage from the ignition-combustion chamber 14 to the second combustion chamber 15, leads to a high turbulence at 20 in the second combustion chamber 15 which favors good afterburning. FIG. 12 which is a view from under the cylinder head 2 shows a favorable valve assembly according to the designs of FIGS. 8 and 11. With this arrangement the placement of the valves 4, 6, and 8 and of the recessed chamber 10 does not pose any problems.

FIG. 13 shows a longitudinal cross-section through one side of the cylindrical separation wall 12. It is evident that the separation wall 12 is fixed by screws in a cylindrical groove of the cylinder head 2. Moreover, it is evident that the holes 13 in the separation wall 12 show a conical form going from the ignition-combustion-chamber to the second combustion chamber with diminishing cross-section.

FIG. 14 presents a special design of a cooled separation wall 12 with drilled cooling channels 23 and oblique passage holes 13.

The cylinder unit presented is distinguished from a common piston-cylinder unit by the design of the piston 3 which shows the groove 16 and which is therefore somewhat heavier than commonly used and by the design of the cylinder head with two or more intake valves 4, 6 and the separation wall 12. In the case that the second combustion chamber 15 should contain a lean mixture instead of pure air, a second carburetor would be necessary or a common carburetor with special design supplying the two mixtures would be utilized. The described design is also applicable to injection engines where the fuel is injected through a nozzle into the intake manifold or the ignition-combustion chamber where it is mixed with the aspirated air. Also for gas engines this described system is applicable.

FIG. 15 shows another possibility of application to a two-stroke engine on the base of a cross-section through the cylinder in the region of the intake or overflow slots and the exhaust slots. The cylinder is in this case divided into an ignition-combustion chamber 14 and two cylindrically segmented second combustion chambers 15a and 15b by two perforated separation walls 12a and 12b. Whilst a rich mixture is ducted into the ignition-combustion chamber 14 through the intake slots coming from a charger or a blower or from the crankcase, air is ducted through the intake slots 26 into the second combustion chambers 15a and 15b coming from another blower. Exhaust slots 27 are placed in the region of the ignition-combustion chamber 14.

Although the present invention has been described in some detail by way of illustration and example for purposes of clarity of understanding, it is understood that certain changes and modifications may be made within the spirit of the invention.

What is claimed is:

1. In an internal combustion engine, the combination comprising a combustion chamber, a head closing one end of said chamber, a piston movable in said chamber toward and away from said head, at least one wall fixed in said chamber at said one end thereof extending longitudinally of piston movement and subdividing the chamber into rich and lean partial chambers, said wall having through holes for directing through passage of fluid between said partial chambers, said head having a head recess opening substantially throughout its extent into said rich partial chamber without appreciable restriction, a rich inlet valve in said head opening through said head recess into said rich partial chamber, a separate lean inlet valve in said head and opening into said lean partial chamber, and ignition means in said rich partial chamber, and said piston having a recess for entry and exit of said wall throughout a considerable extent of piston movement.

2. An internal combustion engine according to claim 1, said lean partial chamber defining approximately 30–40% by volume of said combustion chamber.

3. An internal combustion engine according to claim 2, said combustion chamber being generally cylindrical, and said lean partial chamber being generally annular and surrounding said rich partial chamber.

4. An internal combustion engine according to claim 2, in combination with at least another wall, said one and other walls being spaced from each other angularly about the axis of said combustion chamber.

5. An internal combustion engine according to claim 4, said walls being curved.

6. An internal combustion engine according to claim 1, said through holes being tapered.

7. An internal combustion engine according to claim 1, said holes being arranged to direct fluid angularly with respect to said combustion chamber.

* * * * *